United States Patent [19]

Takagi

[11] 4,183,212
[45] Jan. 15, 1980

[54] SECONDARY AIR CONTROL IN VEHICLE EXHAUST PURIFICATION SYSTEM

[75] Inventor: Yasuo Takagi, Yokohama, Japan

[73] Assignee: Nissan Motor Company, Limited, Yokohama, Japan

[21] Appl. No.: 805,229

[22] Filed: Jun. 9, 1977

[30] Foreign Application Priority Data

Jun. 15, 1976 [JP] Japan .................................. 51/69262

[51] Int. Cl.² .............................................. F01N 3/10
[52] U.S. Cl. ...................................... 60/274; 60/278; 60/290; 60/306
[58] Field of Search ................. 60/274, 278, 290, 289, 60/306

[56] References Cited

U.S. PATENT DOCUMENTS

| | | | |
|---|---|---|---|
| 3,812,673 | 5/1974 | Muroki | 60/290 |
| 3,826,089 | 7/1974 | Nakajima | 60/290 |
| 3,888,080 | 6/1975 | Nohira | 60/290 |
| 3,921,396 | 11/1975 | Nohira | 60/290 |
| 3,948,045 | 4/1976 | Budinski | 60/290 |
| 3,962,868 | 6/1976 | Matumoto | 60/290 |

Primary Examiner—Douglas Hart

[57] ABSTRACT

Control of secondary air flow to a reactor during normal operating condition of an engine is provided by relieving a predetermined portion of the secondary air discharged from an air pump to a point intermediate the reactor and a muffler installed downstream of the reactor. When the engine is operating under heavy load and/or at high speeds, all of the secondary air from the air pump is supplied to the reactor, while when the engine is operating at full load all of the secondary air from the air pump is relieved to the ambient atmosphere.

9 Claims, 4 Drawing Figures

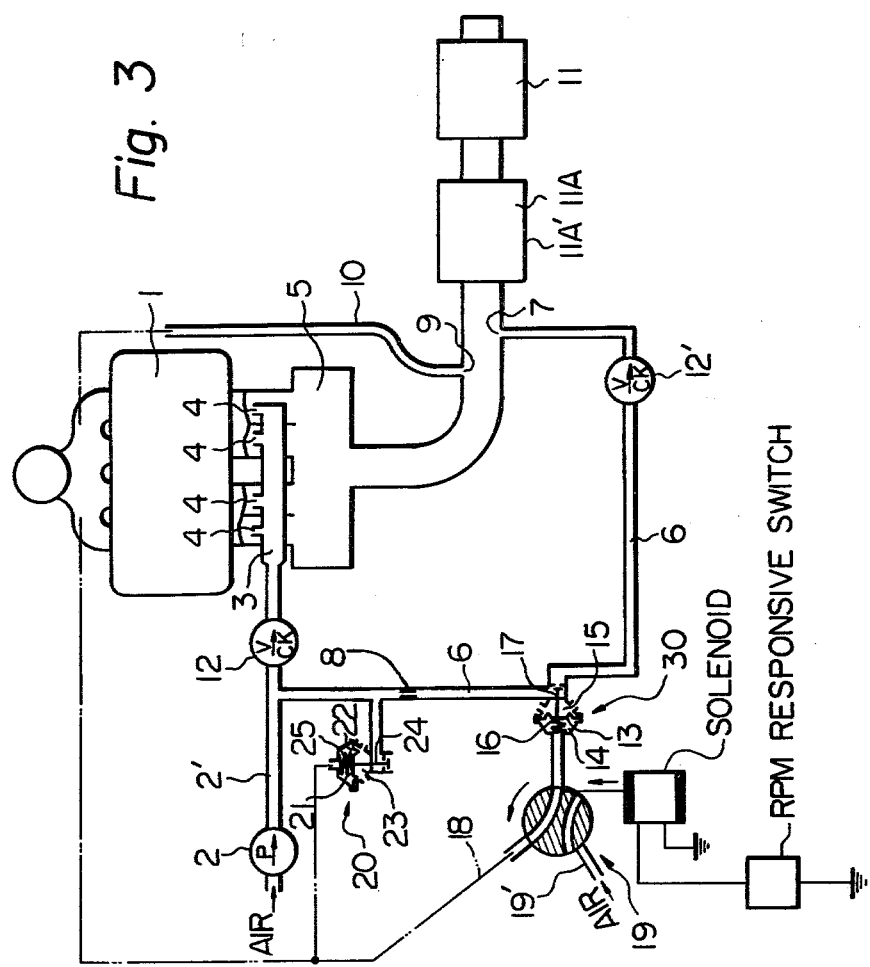

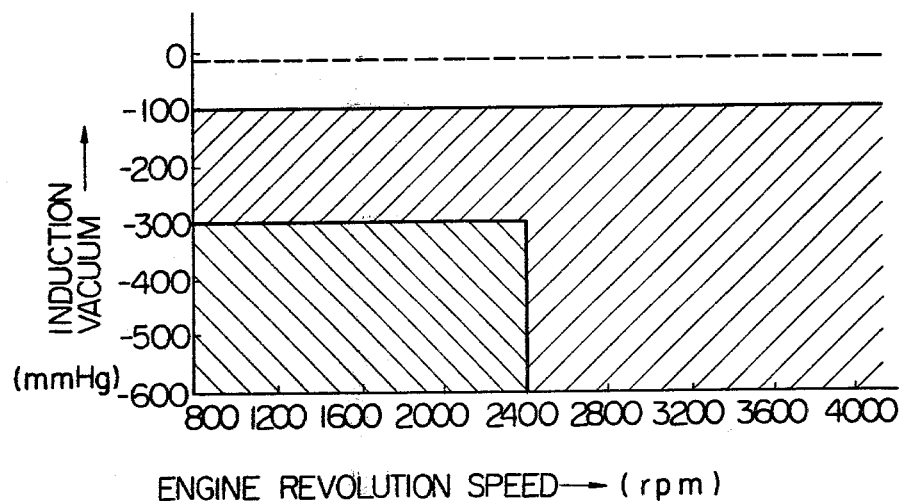

SECONDARY AIR CONTROL IN VEHICLE EXHAUST PURIFICATION SYSTEM

BACKGROUND OF THE INVENTION

The present invention relates to systems for purification of engine exhaust gases and more particularly to an arrangement for directing flow of secondary air discharged from an air pump to a reactor installed in an exhaust system of an internal combustion engine.

It is known to use an air pump as a source of secondary air and to direct flow of secondary air to a suitable point in an engine exhaust system for promoting oxidation reaction of HC and CO contents of the engine exhaust gases within a reactor installed in the exhaust system, the reactor including a thermal reactor, a manifold reactor. It is the common practice, in an exhaust gas purification system, to use an air pump which has a far greater capacity than required in the system in order to compensate for a drop in the pump capacity after a long use. Directing all of secondary air from the air pump to a reactor over the whole operating conditions of an engine to which the purification system is connected is not desirable. If all of the secondary air is supplied to the reactor when the engine operates under light road load, the reactor temperature will be lowered to make it difficult to maintain sufficient oxidation of CO and HC contents. If under this condition rich air fuel mixture is fed to the engine to provide exhaust gases rich enough to react with overabundance of oxygen, the reactor temperature will rise excessively and fuel consumption will increase. To solve this problem it has been practiced to relieve a portion of the secondary air from the air pump to the atmosphere under the control of control means. The control means becomes complicated in construction if flow rate of the secondary air supplied to the reactor is to be precisely controlled. On the other hand, fuel consumption of the engine increases if a carburetor setting is rich to permit rough control of the flow rate of the secondary air supplied to the reactor.

SUMMARY OF THE INVENTION

It is therefore an object of the present invention to provide a simple arrangement for precisely controlling flow of secondary air discharged from an air pump directed to a reactor in an exhaust system of an internal combustion engine. The term "reactor" will hereinafter be used to mean an exhaust manifold, a manifold reactor or the like which require the supply of the secondary air to promote oxidation of HC and CO contents in the engine exhaust gases.

It has been found that precise control of flow of secondary air directed to a reactor during normal operating condition of an internal combustion engine (including an idle operating condition) is possible only by relieving a predetermined portion of percent of all of the secondary air discharged from an air pump. It is appropriate that flow rate of secondary air is supplied to a reactor so that the amount of remaining oxygen content of the exhaust gases is about 2 percent of the whole, and this relation can be obtained if the ratio of the combined flow rates of the intake air passing through a carburetor and of secondary air, to the flow rate of fuel supplied by the carburetor, which ratio will be hereinafter referred to as the overall air to fuel ratio, is 16.

Expressing this by equations, $$AF = Ga/Gf \quad (1)$$

$$(Ga+X)/Gf = 16 \quad (2)$$

where
- AF = air fuel ratio at a carburetor
- Ga = the flow rate of intake air passing through the carburetor
- Gf = the flow rate of fuel supplied by the carburetor
- X = the flow rate of secondary air supplied to a reactor From equations (1) and (2), we obtain $$X = Ga(16/AF) - 1 \quad (3)$$

BRIEF DESCRIPTION OF THE DRAWINGS

The present invention will be described further in connection with the accompanying drawings, in which:

FIG. 3 is a schematic diagram of a system embodying the present invention; and

FIG. 4 is a diagram showing the flow rate of secondary air to be supplied to the system shown in FIG. 3 versus engine operating modes.

DETAILED DESCRIPTION OF THE INVENTION

Figure 1:
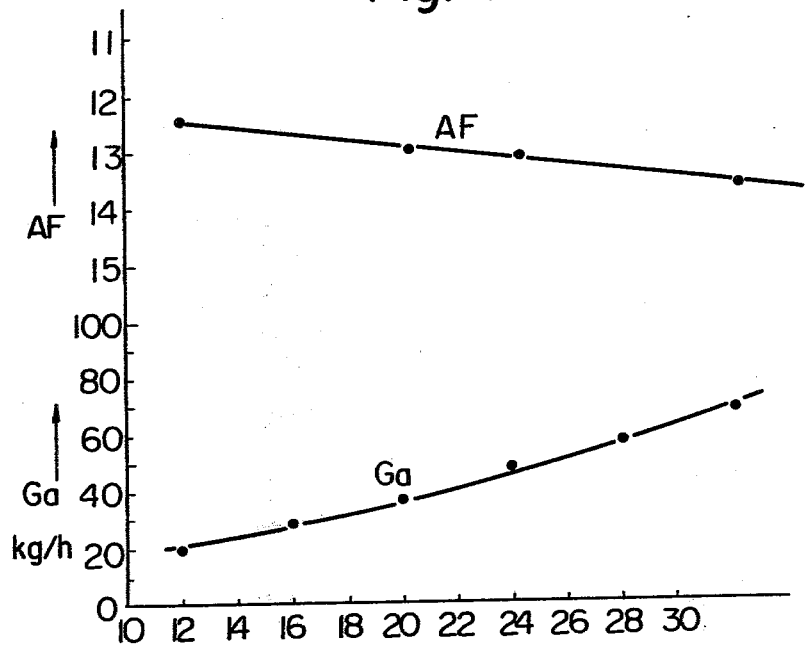
FIG. 1 is a graph showing the changes of Air to Fuel ratio (AF) and flow rate of intake air (Ga) with engine speed.
Figure 2:
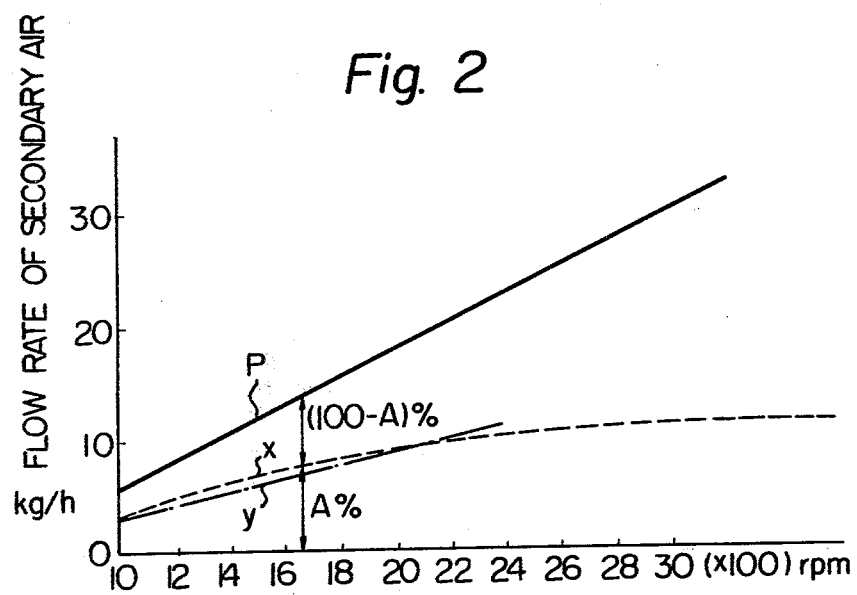
FIG. 2 is a graph showing the changes of X and the full discharge capacity P of an air pump driven by the engine with the engine speed (rpm)

Referring to FIG. 1 of the accompanying drawings, the graph shows the flow rate of intake air passing through the carburetor (Ga) and the air-to-fuel ratio (AF) versus the engine speed (N) with the intake manifold vacuum being kept constant. Substituting the values Ga and AF obtained from the graph into the equation (3), the values plotted on FIG. 2 and traced with a dashed curve designated by X can be obtained. This dashed curve X can be approximated by a chained straight line Y as shown in FIG. 2 during normal engine operating condition, that is, in this case, a mode below a predetermined engine speed of 2,400 rpm and lower than a predetermined vacuum level of −300 mmHg. This chained straight line Y increases generally in proportion to an increase of the engine revolution speed. Thus, with the air pump the discharge amount of which varies generally in proportion to the engine revolution speed (shown by the straight line P in FIG. 2), an appropriate flow rate of secondary air can be supplied to the reactor by supplying A percent of all air discharged from the air pump to the reactor and relieving (100 − A) percent.

To maintain the ratio of the flow rate of secondary air supplied to the reactor to the flow rate of air to be relieved at a fixed value, a relief air passage leads from a secondary air supply passage that leads from an air pump to the upstream portion of the reactor, to the downstream portion of the reactor.

The system embodying the present invention will be explained hereinafter with reference to FIG. 3, in which an internal combustion engine is designated at 1, and an air pump that is driven by the engine 1 at 2. From this air pump a secondary air supply passage 2' leads to an air gallery 3, the secondary air supply passage being provided with a check valve 12. The air gallery 3 has a plurality of nozzles 4 opening to upstream portions in the engine exhaust system of a reactor 5. With this arrangement a portion of a secondary air to be supplied to the reactor 5 flows from the air supply pump 2 to the reactor 5 through the secondary air supply passage 2′, the check valve 12, the air gallery 3 and the nozzles 4.

A relief air passage 6 is branched from the secondary air supply passage 2′ at a portion intermediate the air pump 2 and the check valve 12 and leads to a downstream portion 7 in the engine exhaust system of the reactor 5. That portion of the secondary air to be relieved from the secondary air supply passage 2′ flows to the downstream portion 7 through a flow restricting orifice 8 provided in the passage 6 and a check valve 12′ provided in the passage 6.

Designated by 9 is the portion of the engine exhaust system from which an exhaust gas recirculation conduit 10 leads to the engine intake system. Designated by 11A is a pre-muffler while designated by 11 is a main-muffler. The pre-muffler 11A may be replaced by a catalytic converter 11A′, if desired.

Selecting the size of the flow restricting orifice 8 will cause the ratio of the secondary air portion to be supplied to the reactor 5 to the remaining portion to be relieved to vary.

In a conventional system in which a portion of secondary air is relieved to the atmosphere, the ratio of the portion of a secondary air to be supplied to a reactor to the remaining portion of secondary air to be relieved can not be maintained at a fixed value, because relief portion $\propto \sqrt{Pa - Po}$ supply portion $\propto \sqrt{Pa - Pb}$ Hence relief portion/supply portion $= f(Pb)$ where:
Pa = discharge pressure of the air pump
Po = atmospheric pressure
Pb = exhaust pressure at upstream portion of the reactor According to the invention, relief portion $\propto \sqrt{Pa - Pb'}$ where: Pb′ = exhaust pressure at downstream portion of the reactor
supply amount $\propto \sqrt{Pa - Pb}$
Pb′ ≈ Pb (as compared to the atmospheric pressure)

Hence relief portion/supply portion ≈ const.

Taking the engine operating condition at 2,400 r.p.m. for example, Pa = 20 mmHg/g, Pb′ = 10 mmHg/g, Pb = 8 mmHg/g yields that the proportion of the relief portion of secondary air to the supply portion of secondary air is generally maintained at a fixed value irrespective of the variations of Pa in the case of the system embodying the present invention, while this proportion is not maintained at a fixed value but varies with variations of Pa in the case of the system according to the prior art as mentioned before because Po = 0, the relief portion of secondary air is proportional to $\sqrt{Pa}$ and the supply portion of secondary air is proportional to $\sqrt{Pa - Pb}$.

In a normal operating condition, a predetermined portion of secondary air discharged from the air pump 2 is to be relieved to the downstream portion 7. The normal operating condition is when the engine speed is lower than 2,400 rpm and the induction vacuum higher than −300 mmHg (see FIG. 4).

Reverting to FIG. 3, a control valve 17 is disposed in the relief air passage 6 at a position intermediate between the orifice 8 and the check valve 12′. The control valve 17 is operatively connected with a vacuum motor 30. The vacuum motor 30 has a diaphragm 13, a vacuum chamber 14 on one side of the diaphragm 13, and an atmospheric chamber 15 on the opposite side of the diaphragm 13. The control valve 17 is operatively connected to the diaphragm 13 such that flexure of the diaphragm 13 toward the vacuum chamber in response to a vacuum transmitted to the vacuum chamber 14 will cause the control valve 17 to move against the action of a spring 16 to open the relief passage 6. The spring 16 is disposed in the vacuum chamber to urge the control valve 17 toward a closed position in which the control valve 17 closes the relief passage 6. The vacuum motor 30 is formed with a port connecting the atmospheric chamber to the ambient atmosphere. The vacuum chamber 14 is connected selectively to the induction manifold and the ambient atmosphere under the control of a solenoid operated selector valve 19 which is operative in response to the engine revolution speed.

The selector valve 19 is disposed in a vacuum passage 18 which leads from the engine induction manifold to the vacuum chamber 14 and has an air bleed passage 19′. The selector valve 19 is constructed and arranged such that when the engine speed exceeds a predetermined value, say 2,400 rpm, a solenoid of the selector valve 19 is energized to cause the valve 19 to connect the vacuum chamber 14 only to the air bleed passage 19′ thereby permitting the atmospheric pressure into the vacuum chamber 14. Thus air relief passage 6 is closed to permit all of the secondary air discharged from the air pump 2 into the upstream portions of the reactor 5 through nozzles 4 (see FIG. 4). The spring 16 is so selected that the diaphragm 13 begins to urge the control valve 17 toward an open position when the vacuum level within the vacuum chamber 13 is higher than a predetermined vacuum level, say −300 mmHg.

It will now be noted that during the normal operating condition, the selector valve 19 connects the vacuum chamber 14 to the induction manifold through the vacuum passage 18 and the vacuum within the vacuum chamber 14 causes the diaphragm 13 to urge the valve 17 toward an open position thereby opening the air relief passage 6 and thus the predetermined portion of the secondary air discharged from the air pump 2 will be relieved to the downstream portion 7 of the reactor 5.

When the induction vacuum is lower than the predetermined value or when the engine revolution speed is higher than the predetermined value, the atmosphere or relatively low vacuum is applied to the diaphragm 13 thus permitting the spring 16 to urge the control valve 17 toward a closed position thereby closing the air relief passage 6. Thus all of the secondary air discharged from the air pump 2 will be supplied to the reactor 5, thereby providing sufficient amount of secondary air during accelerating operating condition or preventing the overheating of the reactor 5 during high speed engine operating conditions.

A relief valve 24 is provided to open the relief passage 6 to the ambient atmosphere thereby to relieve all of the secondary air discharged from the air pump 2 to the ambient atmosphere.

The relief valve 24 is actuated by a vacuum motor 20 which has a diaphragm 21 to which the relief valve 24 is operatively connected, a vacuum chamber 22 on one side of the diaphragm 21, and an atmospheric chamber 23 on the opposite side of the diaphragm 21. A spring 25 is disposed within the vacuum chamber 22 acting on the diaphragm 21 to urge the relief valve 24 toward an open position in which the secondary air is relieved to the ambient atmosphere. The vacuum chamber 22 is connected to the induction manifold to receive the induction manifold vacuum. The vacuum motor 20 is designed such that when the induction manifold vacuum is lower than a predetermined value, say −100 mmHg, i.e., the induction manifold vacuum approaches the atmospheric pressure, the diaphragm 21 is fixed downwardly (viewing in FIG. 3) by the action of the spring 25 to urge the relief valve 24 to the open position. Thus when the induction manifold vacuum is lower than −100 mmHg all of the secondary air is relieved to the ambient atmosphere so that supply of the secondary air to the reactor 5 is cut. Hence, excessive reaction within the thermal reactor under this operating condition is suppressed.

When the induction manifold vacuum is higher than the value of −100 mmHg, the relief valve 24 is closed to prevent the secondary air from being relieved to the ambient atmosphere.

What is claimed is:

1. In an engine system:
   an internal combustion engine;
   an intake system connected to said engine and including an intake manifold;
   an exhaust system connected to said engine, said exhaust system including a reactor and a muffler downstream of said reactor;
   a secondary air pump driven by said engine to deliver secondary air at a flow rate proportional to the engine speed of said engine;
   means for selectively supplying all of said secondary air to said reactor, none of said secondary air to said reactor and a predetermined portion of said secondary air simultaneously to said reactor and said muffler system;
   conduit means fluidly interconnecting said pump, a first portion of said exhaust system upstream of said reactor and a second portion of said exhaust system downstream of said reactor and upstream of said muffler for delivering secondary air from said pump to said first and second portions;
   said conduit means having a vent opening communicating with the atmosphere;
   a first valve disposed in said conduit means fluidly intermediate of said pump and said second portion of said exhaust system and downstream of said vent opening with respect to flow of secondary air through said conduit means, said first valve having a closed position in which fluid communication between said pump and said second portion through said conduit means is prevented and an open position in which the fluid communication between said pump and said second portion through said conduit means is permitted;
   a first spring means for biasing said first valve toward the closed position thereof;
   a vacuum responsive means for urging said first valve, against the bias of said first spring means, toward the open position thereof in response to vacuum applied thereto when the vacuum is higher than a first predetermined level;
   means for selectively applying and relieving vacuum prevailing in said intake manifold to and from said vacuum responsive means;
   a second valve cooperating with said vent opening, said second valve having a closed position in which said vent opening is closed and an open position in which said vent opening is opened;
   a second spring means for biasing said second valve toward the open position thereof;
   a second vacuum responsive means for urging said second valve, against the bias of said second spring means, toward the closed position thereof in response to vacuum prevailing in said intake manifold when the vacuum is higher than a second predetermined level that is lower than said first predetermined level.

2. An engine system as claimed in claim 1, in which said selectively applying and relieving means is operative to apply the vacuum prevailing in said intake manifold to said first vacuum responsive means.

3. An engine system as claimed in claim 2, in which said conduit means includes a first conduit leading from said pump to said first portion of said exhaust system and a second conduit branching from said first conduit and leading to said second portion of said exhaust system; in which
said vent opening communicates with said second conduit; and in which
said first valve is disposed in said second conduit.

4. An engine system as claimed in claim 3, in which an orifice is provided in said second conduit upstream of said first valve.

5. An engine system as claimed in claim 3, in which said exhaust system includes a premuffler downstream of said reactor and upstream of said second portion.

6. An engine system as claimed in claim 3, in which said exhaust system includes a catalytic converter downstream of said second portion and upstream of said muffler.

7. An engine system as claimed in claim 3, further including
means for recirculating a portion of exhaust gases from said exhaust system to said intake system, said recirculating means including gas recirculation (EGR) conduit communicating with said exhaust system downstream of said second portion.

8. An engine system as claimed in claim 3, in which said first conduit and second conduit cooperate to proportion the amount of secondary air flowing through said first conduit to said first portion and the amount of secondary air flowing through said second conduit toward said second portion in a fixed ratio.

9. A method of supplying secondary air to an engine system which has an internal combustion engine, an intake manifold, an exhaust manifold, a reactor defined within said exhaust manifold, an exhaust pipe leading from said intake manifold, a muffler disposed in said exhaust pipe and an air pump driven by said engine and which delivers air at a flow rate proportional to the engine speed of said engine, comprising the steps of:
supplying air from said pump through first and second conduit means to said exhaust manifold upstream of said reactor and to said exhaust pipe upstream of said muffler but downstream of said reactor respectively;

proportioning the amount of air supplied through said first and second conduit means to said exhaust manifold with respect to the amount of air supplied to said exhaust pipe in a fixed ratio;

interrupting the flow of air through said second conduit means upon the engine speed of said engine exceeding a predetermined value so that all of the air from said pump is supplied to said exhaust manifold; and venting said second conduit means to the ambient atmosphere upon the vacuum prevailing in said intake manifold falling below a predetermined level.

* * * * *